United States Patent
Fridman et al.

(10) Patent No.: US 11,403,559 B2
(45) Date of Patent: Aug. 2, 2022

(54) SYSTEM AND METHOD FOR USING A USER-ACTION LOG TO LEARN TO CLASSIFY ENCRYPTED TRAFFIC

(71) Applicant: Verint Systems LTD., Herzliya Pituach (IL)

(72) Inventors: Gal Fridman, Tel-Aviv-Jaffa (IL); Offri Gil, Hod-Hasharon (IL); Omer Ziv, Rehovot (IL)

(73) Assignee: COGNYTE TECHNOLOGIES ISRAEL LTD., Pituach (IL)

( * ) Notice: Subject to any disclaimer, the term of this patent is extended or adjusted under 35 U.S.C. 154(b) by 367 days.

(21) Appl. No.: 16/527,373

(22) Filed: Jul. 31, 2019

(65) Prior Publication Data
US 2020/0042897 A1 Feb. 6, 2020

(30) Foreign Application Priority Data
Aug. 5, 2018 (IL) .......................................... 260986

(51) Int. Cl.
*G06N 20/00* (2019.01)
*G06N 5/04* (2006.01)
(Continued)

(52) U.S. Cl.
CPC .............. *G06N 20/00* (2019.01); *G06N 5/04* (2013.01); *H04L 43/02* (2013.01); *H04L 63/0428* (2013.01); *H04L 67/24* (2013.01)

(58) Field of Classification Search
CPC .......... G06N 20/00; G06N 5/04; G06N 5/003; G06N 20/10; H04L 43/02; H04L 63/0428;
(Continued)

(56) References Cited

U.S. PATENT DOCUMENTS

| 5,689,442 A | 11/1997 | Swanson et al. |
| 6,404,857 B1 | 6/2002 | Blair et al. |

(Continued)

FOREIGN PATENT DOCUMENTS

| EP | 0989499 | 3/2000 |
| EP | 1325655 | 7/2003 |

(Continued)

OTHER PUBLICATIONS

Aho, Alfred V., et al., "Efficient String Matching: An Aid to Bibliographic Search," Communication of the ACM, Jun. 1975, vol. 18, No. 6, pp. 333-340.

(Continued)

*Primary Examiner* — Thuong Nguyen
(74) *Attorney, Agent, or Firm* — ISUS Intellectual Property PLLC; Anthony Jason Mirabito

(57) ABSTRACT

Machine learning techniques for classifying encrypted traffic with a high degree of accuracy. The techniques do not require decrypting any traffic and may not require any manually-labeled traffic samples. An automated system uses an application of interest to perform a large number of user actions of various types. The system further records, in a log, the respective times at which the actions were performed. The system further receives the encrypted traffic exchanged between the system and the application server, and records properties of this traffic in a time series. Subsequently, by correlating between the times in the log and the times at which the traffic was received, the system matches each of the user actions with a corresponding portion of the traffic, which is assumed to have been generated by the user action. The system thus automatically builds a labeled training set, which may be used to train a network-traffic classifier.

14 Claims, 7 Drawing Sheets

(51) Int. Cl.
*H04L 43/02* (2022.01)
*H04L 9/40* (2022.01)
*H04L 67/54* (2022.01)

(58) Field of Classification Search
CPC ....... H04L 67/24; H04L 41/16; H04L 43/028; H04L 67/22; H04L 47/2441; H04L 63/0227; H04L 63/1408; H04L 63/30; H04L 63/306
USPC ......... 706/12, 48, 47, 52; 434/362; 370/241; 340/686.1; 702/92, 94
See application file for complete search history.

(56) References Cited

U.S. PATENT DOCUMENTS

| | | | |
|---|---|---|---|
| 6,718,023 | B1 | 4/2004 | Zolotov |
| 6,741,992 | B1 | 5/2004 | McFadden |
| 6,757,361 | B2 | 6/2004 | Blair et al. |
| 7,134,141 | B2 | 11/2006 | Crosbie |
| 7,216,162 | B2 | 5/2007 | Amit et al. |
| 7,225,343 | B1 | 5/2007 | Honig et al. |
| 7,287,278 | B2 | 10/2007 | Liang |
| 7,466,816 | B2 | 12/2008 | Blair |
| RE40,634 | E | 2/2009 | Blair et al. |
| 7,587,041 | B2 | 9/2009 | Blair |
| 7,650,317 | B2 | 1/2010 | Basu et al. |
| 7,941,827 | B2 | 5/2011 | John |
| 8,005,897 | B1 | 8/2011 | Roka et al. |
| RE43,103 | E | 1/2012 | Rozman et al. |
| 8,176,527 | B1 | 5/2012 | Njemanze et al. |
| 8,201,245 | B2 | 6/2012 | Dewey et al. |
| RE43,528 | E | 7/2012 | Rozman et al. |
| RE43,529 | E | 7/2012 | Rozman et al. |
| 8,224,761 | B1 | 7/2012 | Rockwood |
| RE43,987 | E | 2/2013 | Rozman et al. |
| 8,402,543 | B1 | 3/2013 | Ranjan et al. |
| 8,413,244 | B1 | 4/2013 | Nachenberg |
| 8,499,348 | B1 | 7/2013 | Rubin |
| 8,578,493 | B1 | 11/2013 | McFadden |
| 8,682,812 | B1 | 3/2014 | Ranjan |
| 8,762,948 | B1 | 6/2014 | Zaitsev |
| 8,838,951 | B1 | 9/2014 | Hicks et al. |
| 8,839,417 | B1 | 9/2014 | Jordan |
| 8,850,579 | B1 | 9/2014 | Kalinichenko |
| 8,869,268 | B1 | 10/2014 | Barger |
| 8,914,496 | B1 | 12/2014 | Richardson et al. |
| 9,225,829 | B2 | 12/2015 | Agúndez Dominguez et al. |
| 9,514,293 | B1 | 12/2016 | Moritz et al. |
| 2002/0129140 | A1 | 9/2002 | Peled et al. |
| 2003/0097439 | A1 | 5/2003 | Strayer et al. |
| 2003/0103461 | A1 | 6/2003 | Jorgenson |
| 2005/0018618 | A1 | 1/2005 | Mualem et al. |
| 2005/0041590 | A1 | 2/2005 | Olakangil et al. |
| 2007/0180509 | A1 | 8/2007 | Swartz et al. |
| 2007/0186284 | A1 | 8/2007 | McConnell |
| 2007/0192863 | A1 | 8/2007 | Kapoor et al. |
| 2007/0294768 | A1 | 12/2007 | Moskovitch et al. |
| 2008/0014873 | A1 | 1/2008 | Krayer et al. |
| 2008/0028463 | A1 | 1/2008 | Dagon et al. |
| 2008/0069437 | A1 | 3/2008 | Baker |
| 2008/0184371 | A1 | 7/2008 | Moskovitch et al. |
| 2008/0196104 | A1 | 8/2008 | Tuvell et al. |
| 2008/0222127 | A1 | 9/2008 | Bergin |
| 2008/0261192 | A1 | 10/2008 | Huang et al. |
| 2008/0267403 | A1 | 10/2008 | Boult |
| 2008/0285464 | A1 | 11/2008 | Katzir |
| 2009/0106842 | A1 | 4/2009 | Durie |
| 2009/0150999 | A1 | 6/2009 | Dewey et al. |
| 2009/0271370 | A1 | 10/2009 | Jagadish et al. |
| 2010/0002612 | A1 | 1/2010 | Hsu et al. |
| 2010/0061235 | A1 | 3/2010 | Pai et al. |
| 2010/0156653 | A1* | 6/2010 | Chaudhari ............... G01C 9/00 340/686.1 |
| 2010/0192222 | A1 | 7/2010 | Stokes et al. |
| 2010/0306185 | A1 | 12/2010 | Smith et al. |
| 2011/0289025 | A1* | 11/2011 | Yan ........................ G06N 5/025 706/12 |
| 2012/0110677 | A1 | 5/2012 | Abendroth et al. |
| 2012/0222117 | A1 | 8/2012 | Wong et al. |
| 2012/0304244 | A1 | 11/2012 | Xie et al. |
| 2012/0311708 | A1 | 12/2012 | Agarwal et al. |
| 2012/0327956 | A1 | 12/2012 | Vasudevan |
| 2012/0331556 | A1 | 12/2012 | Alperovitch et al. |
| 2013/0014253 | A1 | 1/2013 | Neou |
| 2013/0096917 | A1 | 4/2013 | Edgar et al. |
| 2013/0144915 | A1 | 6/2013 | Ravi et al. |
| 2013/0151616 | A1 | 6/2013 | Amsterdamski |
| 2013/0191917 | A1 | 7/2013 | Warren et al. |
| 2013/0333038 | A1 | 12/2013 | Chien |
| 2014/0059216 | A1 | 2/2014 | Jerrim |
| 2014/0075557 | A1 | 3/2014 | Balabine et al. |
| 2014/0207917 | A1 | 7/2014 | Tock et al. |
| 2014/0298469 | A1 | 10/2014 | Marion et al. |
| 2014/0321290 | A1* | 10/2014 | Jin ........................ H04L 47/2441 370/241 |
| 2014/0351181 | A1* | 11/2014 | Canoy ..................... G06N 20/00 706/12 |
| 2015/0006755 | A1 | 1/2015 | Turlington et al. |
| 2015/0019460 | A1 | 1/2015 | Simard et al. |
| 2015/0024367 | A1* | 1/2015 | Singh ..................... G06K 9/6292 434/362 |
| 2015/0068289 | A1* | 3/2015 | Zhong ..................... G01N 33/2888 73/53.05 |
| 2015/0135326 | A1 | 5/2015 | Bailey, Jr. |
| 2015/0215429 | A1 | 7/2015 | Weisblum et al. |
| 2018/0052840 | A1* | 2/2018 | Scott ....................... G06F 16/44 |
| 2018/0109542 | A1* | 4/2018 | Katzir .................... G06N 20/00 |
| 2018/0343186 | A1* | 11/2018 | Milanese ............ G06F 11/3419 |
| 2019/0145765 | A1* | 5/2019 | Luo ................... G06K 9/00791 702/153 |
| 2019/0156283 | A1* | 5/2019 | Abebe .................... G06Q 10/04 |
| 2019/0190933 | A1* | 6/2019 | Jones .................... G06F 16/285 |
| 2019/0361866 | A1* | 11/2019 | Rogynskyy ........... G06F 16/215 |
| 2019/0394080 | A1* | 12/2019 | Malboubi ........... H04L 41/0613 |
| 2020/0042897 | A1* | 2/2020 | Fridman .............. H04L 63/0428 |
| 2021/0294172 | A1* | 9/2021 | Rasmus-Vorrath ........................ G05B 19/048 |

FOREIGN PATENT DOCUMENTS

| | | |
|---|---|---|
| EP | 2104044 | 9/2009 |
| EP | 2437477 | 4/2012 |
| WO | 2002/028121 | 4/2002 |
| WO | 2012/075347 | 6/2012 |

OTHER PUBLICATIONS

Altshuler, Y., et al., "How Many Makes a Crowd? On the Evolution of Learning as a Factor of Community Coverage," LNCS 7227, 2012, pp. 43-52.
Altshuler, Y., et al., "Incremental Learning with Accuracy Prediction of Social and Individual Properties from Mobile-Phone Data," IEEE, 2011, 10 pages.
Altshuler, Y., et al., "Trade-Offs in Social and Behavioral Modeling in Mobile Networks," LNCS 7812, 2013, pp. 412-423.
Argamon, S., et al., "Automatically Profiling the Author of an Anonymous Text," Communication of the ACM, vol. 52, No. 2, Feb. 2009, pp. 119-123.
Argamon, S., et al., "Gender, Genre, and Writing Style in Formal Written Texts," Text & Talk, vol. 23, Issue 3, 2003, 32 pages.
Atkinson, M., et al., "Near Real Time Information Mining in Multilingual News," World Wide Web Conference, Apr. 20-24, 2009, 2 pages.
Bilge, Leyla, et al., "EXPOSURE: Finding Malicious Domains Using Passive DNS Analysis," Feb. 2011, 17 pages.
Blum, A., et al., "Combining Labeled and Unlabeled Data with Co-Training," School of Computer Science, Carnegie Mellon University, Proceedings of the Eleventh Annual Conference on Computational Learning theory (COLT'98), 1998, pp. 92-100.

(56) References Cited

OTHER PUBLICATIONS

Chawla, N., et al., "SMOTE: Synthetic Minority Over-sampling Technique," Journal of Artificial Intelligence Research, vol. 16, 2002, pp. 321-357.
Cloudshield, Inc., "Lawful Intercept Next-Generation Platform," 2009, 6 pages.
Coffman, T., et al., "Graph-Based Technologies for Intelligence Analysis," CACM, Mar. 2004, 12 pages.
Conti, M., et al., "Can't You Hear Me Knocking: Identification of User Action on Android Apps via Traffic Analysis," arXiv.org>cs>arXiv:1407.7844, Cornell University 2014, 8 pages.
Corney, M., et al. "Gender-Preferential Text Mining of E-mail Discourse," Proceedings of the 18the Annual Computer Security Applications Conference, 2002, 8 pages.
De Vel, O., et al., "Language and Gender Author Cohort Analysis of E-mail for Computer Forensics," Defence Science and Technology Organisation, Australia, 2002, 16 pages.
Dharmapurikar, Sarang, et al., "Fast and Scalable Pattern Matching for Network Intrusion Detection Systems," IEEE Journal on Selected Areas in Communications, Oct. 2006, vol. 24, Issue 10, pp. 1781-1792.
Dietrich, C.J., et al., "CoCoSpot: Clustering and recognizing botnet command and control channels using traffic analysis," 2012, pp. 475-486.
Eagle, N., et al., "Inferring friendship network structure by using mobile phone data," PNAS, vol. 106, No. 36, 2009, pp. 15274-15278.
Eslahi, M., "botAnalytics: Improving HTTP-Based Botnet Detection by Using Network Behavior Analysis system," Dissertation, Faculty of Computer Science and Information Technology, University of Malaya, 2010, 124 pages.
Estival, D., et al., "Author Profiling for English Emails," Proceedings of the $10^{th}$ Conference of the Pacific Association for Computational Linguistics, 2007, pp. 263-272.
Fisk, Mike, et al., "Applying Fast String Matching to Intrusion Detection," Los Alamos National Laboratory and University of California San Diego, Jun. 1975, 22 pages.
FoxReplay Analyst, Fox Replay BV, http//www.foxreplay.com, Revision 1.0, Nov. 2007, 5 pages.
FoxReplay Analyst Product Brochure, Fox-IT BV, http//www.foxreplay.com, 2006, 2 pages.
Goldfarb, Eithan, "Mass Link Analysis: Conceptual Analysis," Jun. 24, 2007, Version 1.1, 21 pages.
Goswami, S., et al., "Stylometric Analysis of Bloggers' Age and Gender," Proceedings of the Third International ICWSM Conference, 2009, pp. 214-217.
Grolman, E., et al., "Transfer Learning for User Action Identification in Mobile Apps via Encrypted Traffic Analysis," IEEE Intelligent Systems, vol. 33, Issue 2, 2018, pp. 40-53.
Hanneke, S., et al., "Iterative Labeling for Semi-Supervised Learning," Tech. Rep. No. UIUCDCS-R-2004-2442, Computer Science Department, University of Illinois at Urbana-Champaign, 2004, 13 pages.
Jacob, G., et al., "JACKSTRAWS: Picking Command and Control Connections from Bot Traffic," Proceedings of the $20^{th}$ Usenix Security Symposium, San Francisco, 2011, 16 pages.
Lakhina, A., et al., "Mining Anomalies Using Traffic Feature Distributions," SIGCOMM, 2005, pp. 217-228.
Lin, Z., et al., "Automatic Protocol Format Reverse Engineering through Context-Aware Monitored Execution," Proceedings of the Network and Distributed System Security Symposium, San Diego, California, 2008, 17 pages.
Liu, R-T., et al., "A Fast Pattern-Match Engine for Network Processor-based NIDS," Proceedings of the $20^{th}$ International Conference on Information Technology (ITCC'04), 2006, 23 pages.
Livadas, C., et al., "Using Machine Learning Techniques to Identify Botnet Traffic," In $2^{nd}$ IEEE LCN Workshop on Network Security (WoNS'2006), 2006, pp. 967-974.
Mohrehkesh, S., et al., "Demographic Prediction of Mobile User from Phone Usage," Proceedings Mobile Data Challenge by Nokia Workshop, Newcastle, United Kingdom, 2012, 4 pages.
Navarro, Gonzalo, et al., "Flexible Pattern Matching in Strings: Practical On-Line Search Algorithms for Texts and Biological Sequences," Cambridge University Press, 2002, 166 pages.
Netronome SSL Inspector Solution Overview White Paper, "Examining SSL-encrypted Communications," 2010, 8 pages.
Nigam, K., et al., "Analyzing the Effectiveness and Applicability of Co-training," Proceedings of the ninth international conference on Information and knowledge management (CIKM'00), 2000, pp. 86-93.
Pan, Long, "Effective and Efficient Methodologies for Social Network Analysis," Dissertation submitted to faculty of Virginia Polytechnic Institute and State University, Blacksburg, Virginia, Dec. 11, 2007, 148 pages.
Rangel, F., et al., "Overview of the Author Profiling Task at PAN 2013," CLEF 2013 Evaluation Labs, 2013, 13 pages.
Rohde & Schwarz GmbH & Co. KG, "Accessnet-T, DMX-500 R2, Digital Mobile eXchange," Product Brochure, Secure Communications, Mar. 2000, 4 pages.
Rohde & Schwarz GmbH & Co. KG, "Accessnet-T IP," Product Brochure, Secure Communications, Jan. 2000, 4 pages.
Rohde & Schwarz GmbH & Co. KG, "R&S AllAudio Integrated Digital Audio Software," Product Brochure, Radiomonitoring & Radiolocation, Feb. 2000, 12 pages.
Rohde & Schwarz GmbH & Co. KG, "R&S AllAudio Integrierte digitale Audio-Software," Product Brochure, Feb. 2002, 12 pages.
Rohde & Schwarz GmbH & Co. KG, "R&S AMMOS GX425 Software," http://www2.rohde-schwarz.com/en/products/radiomonitoring/Signal_Analysis/GX425, Jul. 30, 2010, 1 page.
Rohde & Schwarz GmbH & Co. KG, "R&S AMMOS GX430 PC-Based Signal Analysis and Signal Processing Standalone software solution," http://www2.rohde-schwarz.com/en/products/radiomonitoring/Signal_Analysis/GX430, Jul. 30, 2010, 1 page.
Rohde & Schwarz GmbH & Co. KG, "Digital Standards for R&S SMU200A, R&S SMATE200A, R&S SMJ100A, R&S SMBV100A and R&S AMU200A," Data Sheet, Test & Measurement, May 2000, 68 pages.
Rohde & Schwarz GmbH & Co. KG, "Integrated Digital Audio Software R&S AllAudio," Specifications, 2000, 8 pages.
Rohde & Schwarz GmbH & Co. KG, "R&S RA-CM Continuous Monitoring Software," Product Brochure, Radiomonitoring & Radiolocation, Jan. 2001, 16 pages.
Rohde & Schwarz GmbH & Co. KG, "R&S Ramon COMINT/CESM Software," Product Brochure, Radiomonitoring & Radiolocation, Jan. 2000, 22 pages.
Rohde & Schwarz GmbH & Co. KG, "R&S TMSR200 Lightweight Interception and Direction Finding System," Technical Information, Aug. 14, 2009, 8SPM-ko/hn, Version 3.0, 10 pages.
Saltaformaggio, B., et al., "Eavesdropping on Fine-Grained User Activities Within Smartphone Apps Over Encrypted Network Traffic," Proceedings of the $10^{th}$ USENIX Conference on Offensive Technologies (WOOT'16), 2016, pp. 69-78.
Schulzrinne, H., et al., "RTP: A Transport Protocol for Real-Time Applications," Standards Track, Jul. 2003, 89 pages.
Sheng, Lei, et al., "A Graph Query Language and Its Query Processing," IEEE, Apr. 1999, pp. 572-581.
Soghoian, Christopher, et al., "Certified Lies: Detecting and Defeating Government Interception Attacks Against SSL," 2010, 19 pages.
Stamatatos, E., "Author identification: Using text sampling to handle the class imbalance problem," Science Direct, Information Processing and Management, vol. 44, 2008, pp. 790-799.
Svenson, Pontus, et al., "Social network analysis and information fusion for anti-terrorism," CIMI, 2006, 8 pages.
Thonnard, O., et al., "Actionable Knowledge Discovery for Threats Intelligence Support Using a Multi-Dimensional Data Mining Methodology," 2008 IEEE International Conference on Data Mining Workshops, 2008, pp. 154-163.
Tongaonkar, Alok S., "Fast Pattern-Matching Techniques for Packet Filtering," Stony Brook University, May 2004, 44 pages.
Verint Systems Inc., "Mass Link Analysis: Conceptual Analysis," Jun. 2007, 21 pages.

(56) References Cited

OTHER PUBLICATIONS

Verint Systems Inc., "Mass Link Analysis: Solution Description," Dec. 2008, 16 pages.

Wang, H., et al., "NetSpy: Automatic Generation of Spyware Signatures for NIDS," Proceedings of the $22^{nd}$ Annual Computer Security Applications Conference, Miami Beach, Florida, Dec. 2006, ten pages.

Yu, Fang, et al., "Fast and Memory-Efficient Regular Expression Matching for Deep Packet Inspection," ANCS'06, San Jose, California, Dec. 3-5, 2006, 10 pages.

Yu, Fang, et al., "Gigabit Rate Packet Pattern-Matching Using TCAM," Proceedings of the 12th IEEE International Conference on Network Protocols (ICNP'04), 2004, 10 pages.

Search Report, dated Dec. 3, 2019, received in connection with corresponding EP Patent Application No. 19189781.8.

\* cited by examiner

| Time of receipt by router | Type of packet | Size (bytes) | SrcIP | SrcPort | DstIP | DstPort | Domain |
|---|---|---|---|---|---|---|---|
| 1527141095 | Control | 207 | 10.0.20.128 | 58183 | 157.240.20.63 | 47 | instagram.c10r.facebook.com |
| 1527141095 | Data | 214 | 157.240.20.10 | 443 | 10.0.20.128 | 58183 | mqtt.c10r.facebook.com |
| 1527141096 | Data | 1300 | 157.240.20.63 | 443 | 10.0.20.128 | 58188 | instagram.c10r.facebook.com |
| ... | ... | ... | ... | ... | ... | ... | ... |

35

FIG. 2

SYSTEM AND METHOD FOR USING A USER-ACTION LOG TO LEARN TO CLASSIFY ENCRYPTED TRAFFIC

FIELD OF THE DISCLOSURE

The present disclosure is related to the monitoring of encrypted communication over communication networks, and to the application of machine-learning techniques to facilitate such monitoring.

BACKGROUND OF THE DISCLOSURE

Many applications, such as Gmail, Facebook, Twitter, and Instagram, use an encrypted protocol, such as the Secure Sockets Layer (SSL) protocol or the Transport Layer Security (TLS) protocol. An application that uses an encrypted protocol generates encrypted traffic, upon a user using the application to perform a user action.

In some cases, marketing personnel may wish to learn more about a user's online activities, in order to provide the user with relevant marketing material that is tailored to the user's behavioral and demographic profile. However, if the user's traffic is mostly encrypted, it may be difficult to learn anything about the user's online activities.

Conti, Mauro, et al. "Can't you hear me knocking: Identification of user actions on Android apps via traffic analysis," Proceedings of the 5th ACM Conference on Data and Application Security and Privacy, A C M, 2015, describes an investigation as to which extent it is feasible to identify the specific actions that a user is performing on mobile apps, by eavesdropping on their encrypted network traffic.

Saltaformaggio, Brendan, et al. "Eavesdropping on fine-grained user activities within smartphone apps over encrypted network traffic," Proc. USENIX Workshop on Offensive Technologies, 2016, demonstrates that a passive eavesdropper is capable of identifying fine-grained user activities within the wireless network traffic generated by apps. The paper presents a technique, called NetScope, that is based on the intuition that the highly specific implementation of each app leaves a fingerprint on its traffic behavior (e.g., transfer rates, packet exchanges, and data movement). By learning the subtle traffic behavioral differences between activities (e.g., "browsing" versus "chatting" in a dating app), NetScope is able to perform robust inference of users' activities, for both Android and iOS devices, based solely on inspecting IP headers.

Grolman, Edita, et al., "Transfer Learning for User Action Identification in Mobile Apps via Encrypted Traffic Analysis," IEEE Intelligent Systems (2018), describes an approach for inferring user actions performed in mobile apps by analyzing the resulting encrypted network traffic. The approach generalizes across different app versions, mobile operating systems, and device models, collectively referred to as configurations. The different configurations are treated as a case for transfer learning, and the co-training method is adapted to support the transfer learning process. The approach leverages a small number of labeled instances of encrypted traffic from a source configuration, in order to construct a classifier capable of identifying a user's actions in a different (target) configuration which is completely unlabeled.

Hanneke, Steve, et al., Iterative Labeling for Semi-Supervised Learning, University of Illinois, 2004 proposes a unified perspective of a large family of semi-supervised learning algorithms, which select and label unlabeled data in an iterative process.

SUMMARY OF THE DISCLOSURE

There is provided, in accordance with some embodiments of the present disclosure, a system that includes a communication interface and a processor. The processor is configured to obtain a user-action log that specifies (i) a series of actions, of respective action types, performed using an application, and (ii) respective action times at which the actions were performed. The processor is further configured to, using the communication interface, obtain a network-traffic report that specifies properties of a plurality of packets that were exchanged, while the series of actions were performed, between the application and a server for the application, the properties including respective receipt times at which the packets were received while en route between the application and the server. The processor is further configured to, based on the receipt times, define multiple non-overlapping blocks of consecutive ones of the packets. The processor is further configured to identify a correspondence between the actions and respective corresponding ones of the blocks, by correlating between the action times and the receipt times, and, based on the identified correspondence, train a classifier to associate other blocks of packets with respective ones of the action types based on the properties of the other blocks.

In some embodiments, the processor is configured to identify the correspondence and train the classifier by iteratively (i) using the classifier to select additional ones of the corresponding blocks, and augmenting a training set with the additional corresponding blocks, and (ii) using the augmented training set, retraining the classifier.

In some embodiments, the processor is configured to select the additional ones of the corresponding blocks by, for each action in a subset of the actions that do not yet belong to the training set:

identifying one or more candidate blocks whose respective earliest receipt times correspond to the action time of the action, and using the classifier to select one of the candidate blocks as the block that corresponds to the action.

In some embodiments, the processor is configured to identify the candidate blocks by:

defining a window of time that includes the action time of the action, and identifying the candidate blocks in response to the candidate blocks beginning in the window of time.

In some embodiments, the processor is configured to use the classifier to select one of the candidate blocks by:

using the classifier, computing respective levels of confidence for the candidate blocks being associated with the action type of the action, and selecting the candidate block whose level of confidence is highest, relative to the other candidate blocks.

In some embodiments, the processor is configured to select the candidate block whose level of confidence is highest provided that the highest level of confidence is greater than a level-of-confidence threshold, and the processor is further configured to iteratively lower the level-of-confidence threshold when iteratively augmenting the training set.

In some embodiments, the processor is further configured to add the other candidate blocks, with respective labels indicating that the other candidate blocks do not correspond to any of the actions, to the training set.

In some embodiments, the processor is further configured to cause the user actions to be performed automatically.

In some embodiments, content of the packets is encrypted, and the properties of the packets do not include any of the encrypted content.

In some embodiments, the processor is further configured to, prior to identifying the correspondence between the actions and the respective corresponding ones of the blocks, inflate the action times.

In some embodiments, the processor is configured to inflate the action times by, for each unique action type:

computing, for a subgroup of the actions that are of the unique action type, respective estimated communication delays, by, for each action in the subgroup:

identifying a block whose earliest receipt time follows the action time of the action and is closest to the action time of the action, relative to the other blocks, and computing the estimated communication delay for the action, by subtracting the action time of the action from the earliest receipt time of the identified block, computing a median of the estimated communication delays, and adding the median to the respective action times of the subgroup.

In some embodiments, the processor is further configured to:

repeatedly define the blocks based on different respective sets of packet-aggregation rules, such that multiple classifiers are trained for the different respective sets of packet-aggregation rules, and select a best-performing one of the multiple classifiers for use.

There is further provided, in accordance with some embodiments of the present disclosure, a method that includes obtaining a user-action log that specifies (i) a series of actions, of respective action types, performed using an application, and (ii) respective action times at which the actions were performed. The method further includes obtaining a network-traffic report that specifies properties of a plurality of packets that were exchanged, while the series of actions were performed, between the application and a server for the application, the properties including respective receipt times at which the packets were received while en route between the application and the server. The method further includes, based on the receipt times, defining multiple non-overlapping blocks of consecutive ones of the packets. The method further includes identifying a correspondence between the actions and respective corresponding ones of the blocks, by correlating between the action times and the receipt times, and, based on the identified correspondence, training a classifier to associate other blocks of packets with respective ones of the action types based on the properties of the other blocks.

The present disclosure will be more fully understood from the following detailed description of embodiments thereof, taken together with the drawings, in which:

BRIEF DESCRIPTION OF THE DRAWINGS

FIG. 2 is a schematic illustration of an example network-traffic report, in accordance with some embodiments of the present disclosure;

DETAILED DESCRIPTION OF EMBODIMENTS

Overview

Figure 1:
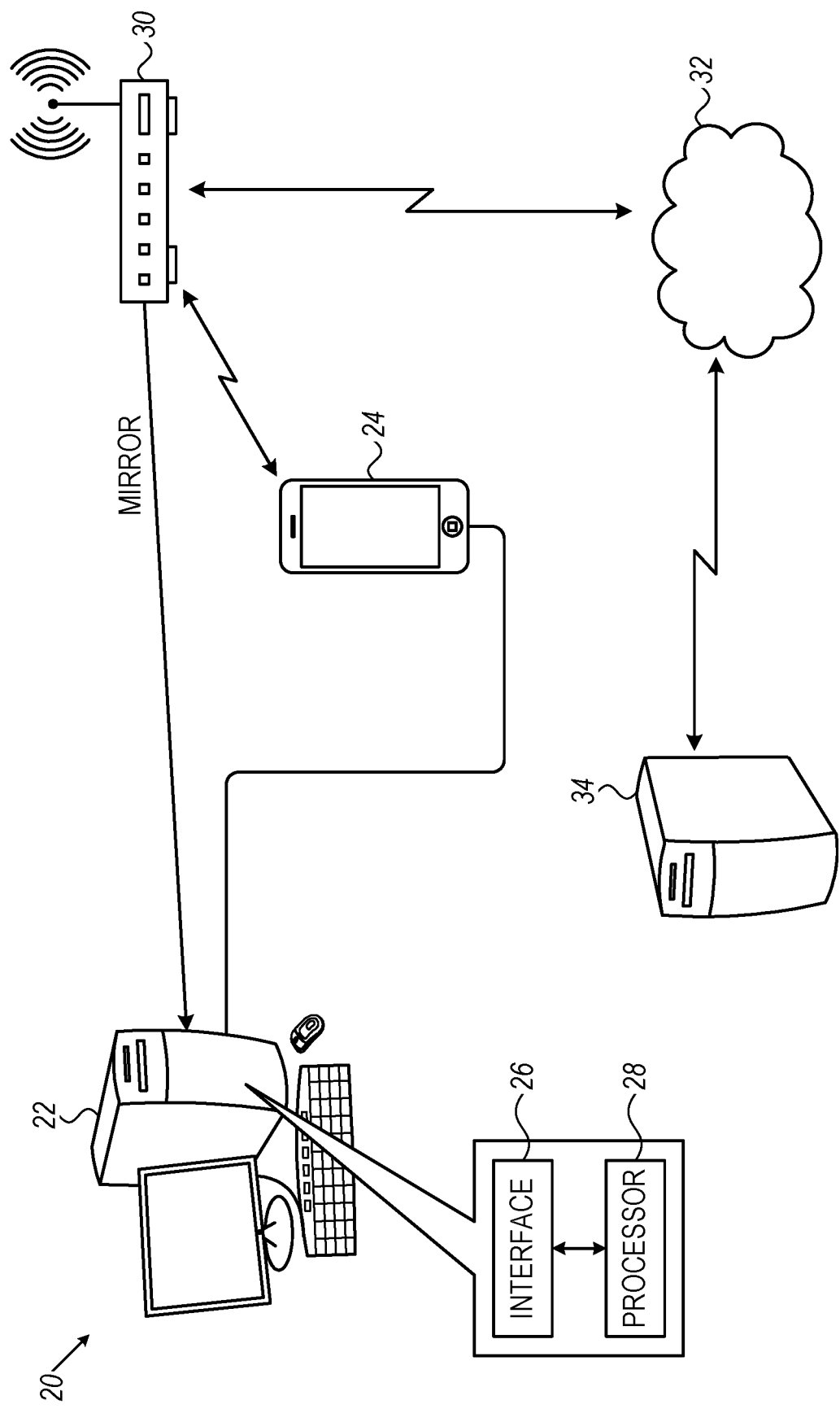
FIG. 1 is a schematic illustration of a system for training a classifier to classify encrypted network traffic, in accordance with some embodiments of the present disclosure.

Embodiments of the present disclosure include machine learning techniques for quickly, and with minimal human involvement, learning to classify encrypted traffic with a high degree of accuracy. Advantageously, the techniques described herein do not require decrypting any traffic, and may not require any manually-labeled traffic samples.

To perform the techniques described herein, an automated system uses an application of interest to perform a large number of user actions of various types. For example, using the Facebook application, the system may perform a large number of "post" actions, a large number of "like" actions, and a large number of actions of various other types. The system further records, in a log, the respective times at which the actions were performed. The system further receives the encrypted traffic exchanged between the system and the application server, and records properties of this traffic in a time series. Subsequently, by correlating between the times in the log and the times at which the traffic was received, the system matches each of the user actions with a corresponding portion of the traffic, which is assumed to have been generated by the user action. The system thus automatically builds a labeled training set, which may be used to train a network-traffic classifier.

More specifically, the system begins by dividing the time series into blocks (i.e., sequences of packets) of traffic, based on a set of rules, which may be referred to as "packet-aggregation rules" or "block-definition rules." For example, one rule may specify that two successive packets are to be assigned to the same block if the interval between the packets is less than a predefined threshold, and to different blocks if the interval is not less than the threshold.

Subsequently, the system matches a first subset of the user actions to corresponding blocks of the encrypted traffic, by correlating between the respective times of the user actions, as recorded in the log, and the times of the corresponding blocks of traffic. The first subset of user actions, along with the corresponding blocks of encrypted traffic, are used to initialize a training set.

Next, the system uses the initial training set to train a classifier. In particular, the system trains the classifier to identify the types of user actions belonging to the first subset, based on features of the corresponding blocks. Such features may include statistical properties of (i) the times at which the packets in the blocks were received, (ii) the sizes of the packets, and/or (iii) the directionality of the packets. For example, such features may include the average, maximum, or minimum duration between packets, the average, maximum, or minimum packet size, or the ratio of the number, or total size of, the transmitted packets to the number, or total size of, the received packets.

Subsequently, the system matches a second subset of the user actions to corresponding blocks of encrypted traffic. This matching is performed by correlating between the times of the user actions and the times of the blocks, and also by using the classifier to identify the most likely matching block for each of the actions. The second subset of user actions, along with their corresponding traffic blocks, are then added to the training set. The system then retrains the classifier, using the augmented training set.

Subsequently, the system continues to iteratively augment the training set and retrain the classifier, until the classifier has been trained on all of the user actions, excluding any user actions for which a corresponding block of traffic could not be found.

Typically, when attempting to match a given user action to a corresponding traffic block, the system first looks up the time of the user action that was recorded in the log. The system then defines a time window that begins before the recorded time, and ends after the recorded time. Next, at least some of the blocks that begin within the window are identified as candidate matches to the user action. Subsequently, the system applies the classifier to all of the candidate blocks, and then selects the candidate block that was classified with the highest likelihood as being of the user-action type. This block may then be paired, in the training set, with the user action.

Typically, the above-described iterative training is performed multiple times, for multiple different sets of block-definition rules, such that multiple classifiers are trained. Subsequently, based on various criteria described in detail below, one of these classifiers is selected for use in classifying subsequent network traffic.

In some embodiments, to facilitate initializing the training set, the system begins with a preexisting classifier. For example, the system may use a classifier that was trained on samples from another runtime environment, such as a previous version of the application. Alternatively or additionally, the system may initialize the training set with a number of manually-labeled samples.

System Description

Reference is initially made to FIG. 1, which is a schematic illustration of a system 20 for training a classifier to classify encrypted network traffic, in accordance with some embodiments of the present disclosure. System 20 comprises a classifier trainer 22, comprising, for example, a desktop or laptop computer comprising a communication interface 26, such as a network interface controller (NIC) or wireless NIC (WNIC), and a processor 28. As further described below, processor 28 uses interface 26 to obtain a network-traffic report, either by receiving network traffic via the communication interface and then generating the report based on the received traffic, or by receiving the report from an external device via the communication interface. Subsequently, using the network-traffic report and an associated user-action log, the processor trains a network-traffic classifier.

In some embodiments, as illustrated in FIG. 1, system 20 is further configured to generate the user-action log and encrypted traffic that are used to train the classifier, by causing the user actions to be performed automatically (i.e., without any intervention from a human user). For example, processor 28 may drive a mobile communication device 24, and/or any other type of application-running device (e.g., a laptop or desktop computer), to perform a series of user actions using the application for which the classifier is desired. This task may be performed, for example, using the SeeTest platform provided by Experitest Ltd. of Poleg, Israel, or using any other suitable commercially-available software program for automated application control. Alternatively, processor 28 may automatically perform the user actions, by running the application on classifier trainer 22.

As the actions are performed, processor 28 (or a processor of the mobile communication device) generates the log by logging the type of each action, the time at which the action was performed, and, optionally, other information associated with the action. The performance of each user action by the mobile communication device causes encrypted network traffic to be exchanged, over a network 32 (typically, the Internet), between the application and at least one server 34 that services the application, as further described below.

Typically, the processor further records relevant metadata in the log. Such metadata may include, for example, the type of the device that was used to perform the actions (e.g., "iPhone 6s"), the operating system version (e.g., "iOS 11.2.2"), the application name (e.g., "Instagram"), the application version (e.g., "45.0"), and the Internet Protocol (IP) address of the device (e.g., "10.0.20.128"). The user-action log may be stored in any suitable format, such as the txt or xml format.

By way of example, Table 1 below shows a snippet from a hypothetical user-action log, for a series of user actions performed using the Instagram application. Each row in Table 1 corresponds to a different respective action. (The times in Table 1 are in the Unix time format.)

TABLE 1

| Time | Action Type |
| --- | --- |
| 1527141150 | Post photo |
| 1527141180 | Post text |
| 1527141210 | Share post |

In some embodiments, a suitable automation program running on mobile communication device 24 causes the mobile communication device to automatically perform the user actions, even without any instructions from processor 28.

System 20 further comprises a router 30, which manages the flow of encrypted traffic between the mobile communication device and server 34 as the user actions are performed. Router 30 additionally mirrors this traffic to classifier trainer 22. (In other words, the router copies each received packet, and communicates the copy to the classifier trainer.) By running suitable packet-analyzing software, such as the Wireshark open source software, processor 28 generates a file, such as a packet capture (pcap) file, that specifies relevant properties of each packet received from the router. Examples of relevant properties include the size of the packet, the time at which the packet was received by the router, the source IP address and port, and the destination IP address and port. Subsequently, the processor generates a network-traffic report from the file. The network-traffic report may be stored in any suitable format, such as the csv format. (An example network-traffic report is shown in FIG. 2 and described below.)

Next, the processor preprocesses the user-action log and the network-traffic report, as described below with reference to FIGS. 3-4. Subsequently, the processor generates a training set by correlating between the user-action log and the network-traffic report, and then uses the training set to train a classifier, as described below with reference to FIGS. 4-5.

Typically, the internal clock of router 30 is synchronized with that of mobile communication device 24 (or with whichever other device performs the user actions), such as to facilitate correlating between the user-action log and the network-traffic report.

In other embodiments, another device that is external to system 20 performs the user actions, and logs these user actions as described above. The external device further communicates the user-action log to classifier trainer 22. Similarly, the corresponding network traffic, or a network-traffic report generated responsively thereto, may be communicated to classifier trainer 22 from outside system 20.

In yet other embodiments, a human user performs the user actions, and logs these actions on classifier trainer 22.

In some embodiments, the user actions are performed using a single device, such that classifier trainer 22 trains a classifier that is specific to a single type of device and operating system. Subsequently, other classifiers may be trained for other types of devices and operating systems, using other pairs of user-action logs and network-traffic reports generated by other devices. (Alternatively or additionally, transfer learning techniques, such as those described in U.S. patent application Ser. No. 15/911,223, entitled "Transfer learning for identifying user actions," whose disclosure is incorporated herein by reference, may be used to train other classifiers.) In other embodiments, user actions from multiple different types of devices and operating systems are used to generate a single training set, such that the classifier trained by classifier trainer 22 is not specific to any particular type of device or operating system.

In general, router 30 may be connected to classifier trainer 22, to mobile communication device 24, and to network 32 over any suitable wired or wireless connections. Similarly, mobile communication device 24 may be connected to classifier trainer 22 over any suitable wired or wireless connection. Classifier trainer 22 may use communication interface 26, and/or any other suitable communication interface, to communicate with router 30, mobile communication device 24, and/or any external device.

In general, processor 28 may be embodied as a single processor, or as a cooperatively networked or clustered set of processors. In some embodiments, the functionality of processor 28, as described herein, is implemented solely in hardware, e.g., using one or more Application-Specific Integrated Circuits (ASICs) or Field-Programmable Gate Arrays (FPGAs). In other embodiments, the functionality of processor 28 is implemented at least partly in software. For example, in some embodiments, processor 28 is embodied as a programmed digital computing device comprising at least a central processing unit (CPU) and random access memory (RAM). Program code, including software programs, and/or data are loaded into the RAM for execution and processing by the CPU. The program code and/or data may be downloaded to the processor in electronic form, over a network, for example. Alternatively or additionally, the program code and/or data may be provided and/or stored on non-transitory tangible media, such as magnetic, optical, or electronic memory. Such program code and/or data, when provided to the processor, produce a machine or special-purpose computer, configured to perform the tasks described herein.

The Network-Traffic Report

Reference is now made to FIG. 2, which is a schematic illustration of an example network-traffic report 35, in accordance with some embodiments of the present disclosure.

Network-traffic report 35 includes multiple entries, which correspond to different respective packets that were exchanged between mobile communication device 24 (and, optionally, other devices) and server 34 while the user actions were performed by mobile communication device 24 (and, optionally, other devices). (FIG. 2 assumes that the actions were performed using the Instagram application.) In the event that the report is stored in the csv format, each packet may be represented by a different respective row, which delineates properties of the packet. As shown in FIG. 2, such properties may include, for example, the receipt time at which the packet was received (by the router) while en route between the mobile communication device and the server, the type of the packet (i.e., whether the packet is a control packet or a data packet), the size of the packet, the source IP address (SrcIP) and port (SrcPort), the destination IP address (DstIP) and port (DstPort), and the domain with which the packet was exchanged. Other examples of properties include the protocol to which the packet belongs. The properties of the packets typically do not include any encrypted content of the packets.

Some packets may include an unencrypted time stamp that specifies the time at which the packet was communicated from the packet's source. This time stamp may be used, instead of the aforementioned receipt time, to correlate between the user-action log and the network-traffic report. Alternatively, provided that the packets are immediately mirrored to classifier trainer 22, the time at which the packets are received by the classifier trainer may be used.

Preprocessing the User-Action Log

Figure 3:
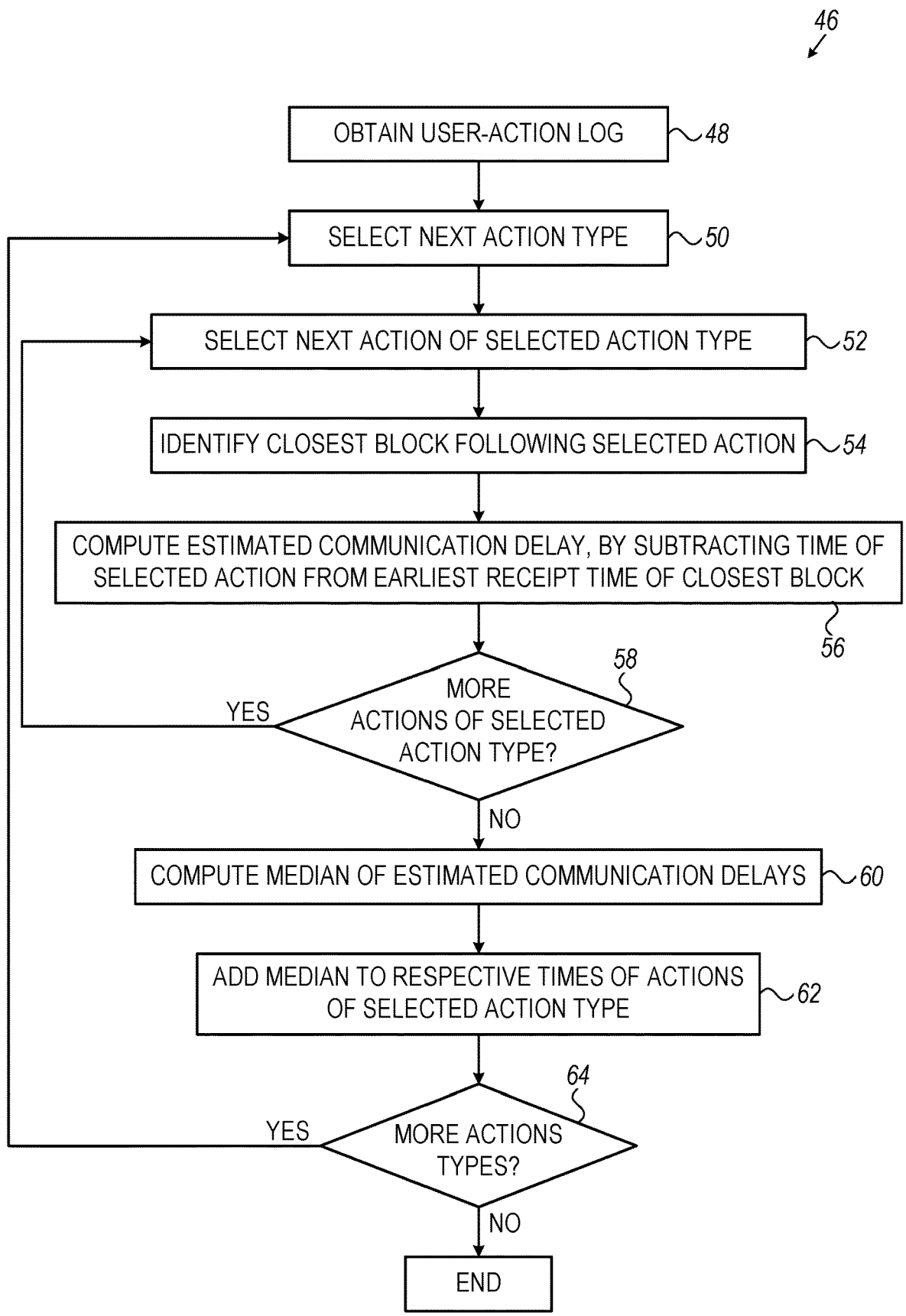
FIG. 3 is a flow diagram for a method for preprocessing a user-action log, in accordance with some embodiments of the present disclosure.

Reference is now made to FIG. 3, which is a flow diagram for a method 46 for preprocessing a user-action log, in accordance with some embodiments of the present disclosure. Method 46 may be performed by processor 28 (as assumed in the description below), or by another processor external to system 20.

Method 46 begins at a log-obtaining step 48, at which processor 28 obtains a user-action log that specifies (i) a series of actions, of respective action types, performed using the application, and (ii) respective action times at which the actions were performed. As described above with reference to FIG. 1, processor 28 may obtain the log by recording the log as the user actions are performed, or by receiving the log from another source.

Next, the processor inflates the times of the actions that are specified in the log, to compensate for any delays in communication. In other words, the processor compensates for the systematic delay between the performance of each user action (i.e., the final command or "click" that triggers the action), and the communication of the first packet from the device responsively to the action.

In general, the communication delay varies between different action types. Hence, the inflation of the action times is typically performed separately for each unique action type, in that, for each unique action type, the processor (i) identifies the subgroup of actions that are of the action type, (ii) computes an estimated communication delay for the subgroup, and (iii) adds the estimated communication delay to the respective action times of the subgroup. Typically, the estimated communication delay is the median of the individual estimated communication delays of the subgroup.

More specifically, following log-obtaining step 48, the processor first selects an action type, at an action-type-selecting step 50. (For example, for the Instagram application, the processor may select the "post photo" action type.)

Next, at an action-selecting step 52, the processor selects an action that is of the selected action type. Subsequently, at a closest-block-identifying step 54, the processor identifies the block that follows the selected action and is closest, in time, to the selected action. In other words, the processor identifies the block whose earliest receipt time follows the time of the action and is closest to the time of the action, relative to the other blocks. (The "earliest receipt time" of a block is the time at which the first packet belonging to the block, or the first transmit packet belonging to the block, was received.) For example, given a hypothetical action time of X, and three nearby blocks whose first packets have respective receipt times of X−100, X+100, and X+200, the processor may identify the block having the earliest receipt time of X+100 as the closest block.

Subsequently, at an estimated-delay-computing step 56, the processor computes an estimated communication delay for the selected action, by subtracting the time of the action from the earliest receipt time of the closest block. For example, in the hypothetical case above, the estimated communication delay would be computed as 100.

Next, at a first checking step 58, the processor checks whether any more actions of the selected action type have yet to be selected. If yes, the processor returns to action-selecting step 52, and then computes the estimated communication delay for the next action. Otherwise, the processor, at a median-computing step 60, computes the median of the estimated communication delays that were computed for the selected action type. The processor then adds the median, at an inflating step 62, to the respective times of the actions that are of the selected action type.

Subsequently, at a second checking step 64, the processor checks whether any more action types represented in the user-action log have yet to be selected. If yes, the processor returns to action-type-selecting step 50, and then inflates the respective times of the actions of the next action type. Otherwise, the preprocessing of the user-action log ends.

Training Classifiers to Classify Network Traffic

Following the preprocessing of the user-action log, the processor identifies a correspondence between the actions and respective corresponding ones of the blocks, by correlating between the action times of the actions and the (earliest) receipt times of the blocks. In other words, based on observed correlations in time, the processor matches each action to one of the blocks. Based on the identified correspondence between the actions and the blocks, the processor trains a classifier to classify other blocks of packets (i.e., to associate other blocks with respective action types), based on the properties of the other blocks.

Typically, the processor identifies the correspondence and trains the classifier in an iterative manner. In particular, during each iteration, the processor uses the classifier to select some additional corresponding blocks, labels these blocks with the corresponding action types, augments a training set with the labeled blocks, and then retrains the classifier using the augmented training set.

In some embodiments, the above-described iterative process is performed multiple times, for different respective sets of predefined packet-aggregation rules, such that multiple different classifiers are trained. For example, the processor may use between 6,000 and 10,000 different sets of rules, such that between 6,000 and 10,000 classifiers may be trained. Subsequently, the processor selects the best-performing classifier for use in classifying subsequent traffic.

Figure 4:
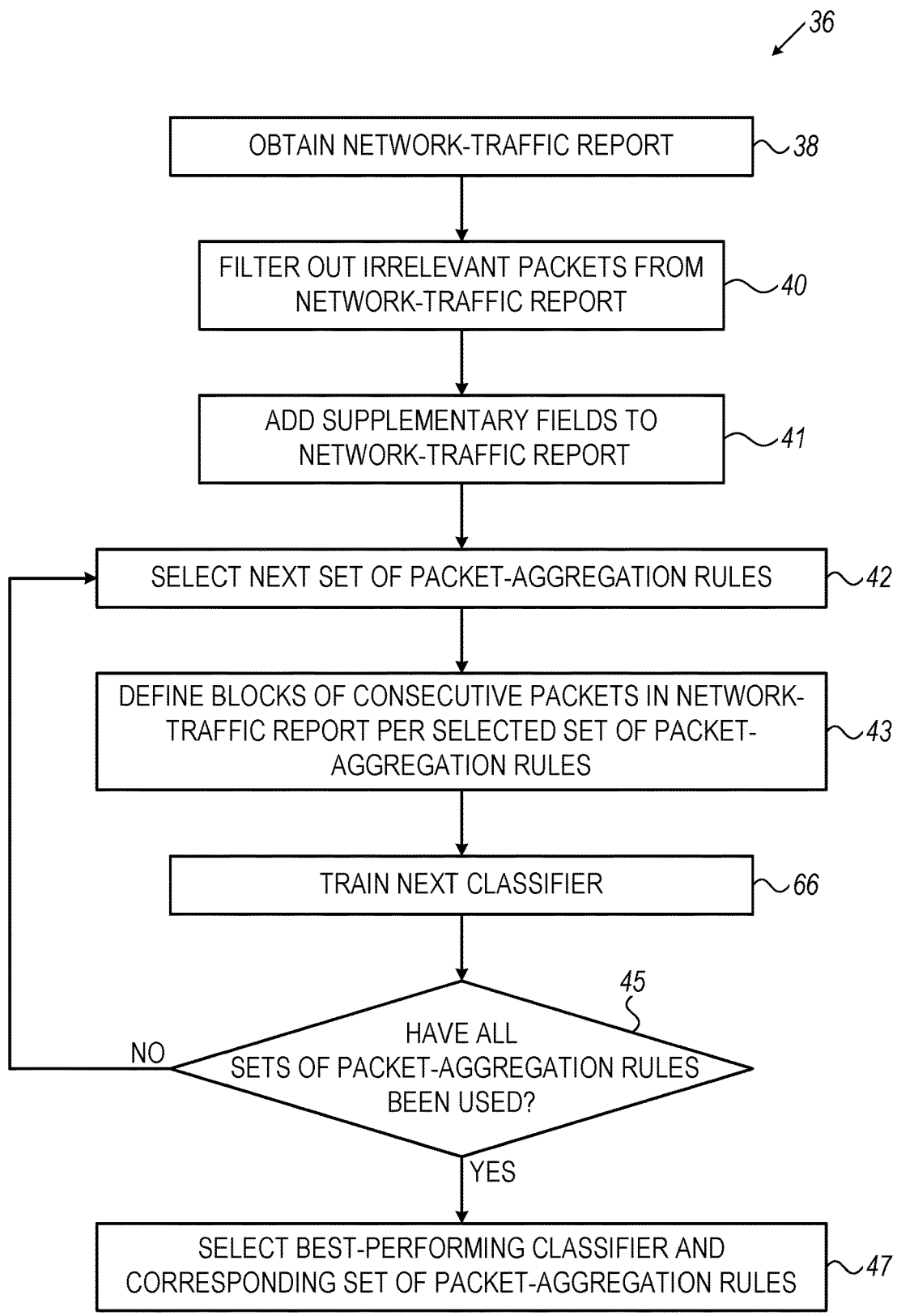
FIG. 4 is a flow diagram for a method for training multiple classifiers, in accordance with some embodiments of the present disclosure.

In this regard, reference is now made to FIG. 4, which is a flow diagram for a method 36 for training multiple classifiers, in accordance with some embodiments of the present disclosure.

Method 36 begins with a report-obtaining step 38, at which processor 28 obtains a network-traffic report that specifies properties of a plurality of packets. (As described above with reference to FIG. 1, processor 28 may obtain the network-traffic report by generating the report, or by receiving the report from another source.) Next, the processor preprocesses the network-traffic report by performing a filtering step 40 and a report-enhancing step 41, as further described immediately below.

At filtering step 40, the processor filters out any irrelevant packets from the network-traffic report. (In other words, the processor removes, from the report, any entries corresponding to irrelevant packets.) Irrelevant packets include, for example, any packets that are known a priori to be related to background communication between the application and the server (or between another application and another server), rather than to any of the user actions. Thus, for example, the processor may filter out any control packets (leaving only the data packets), any packets that do not use the protocol of interest, and any packets that were exchanged with an IP address or a domain that is known not to service user actions for the application.

At report-enhancing step 41, the processor adds various supplementary fields to the report. For example, the processor may add a directionality field to the report. In particular, if the source IP address specified for the packet is that of mobile communication device 24, the packet may be assigned a "Tx" value, indicating that the packet was transmitted from the device; otherwise, the packet may be assigned an "Rx" value, indicating that the packet was received by the device. Another example of a supplementary field is a "dTime" field, to which is assigned the difference between the receipt time of the current packet and the receipt time of the previous packet.

(It is noted that the report may alternatively be preprocessed before the preprocessing of the user-action log. Furthermore, the preprocessing may be performed by another processor external to system 20, rather than by processor 28.)

Following the preprocessing of the report, the processor, at a rule-set-selecting step 42, selects the next set of packet-aggregation rules from the multiple predefined sets. Next, at a block-defining step 43, the processor defines multiple non-overlapping blocks of consecutive packets in the network-traffic report, per the selected set of packet-aggregation rules. (It is noted that the word "consecutive" is used with reference to the status of the report following filtering step 40.) In other words, the processor divides the entries in the report into multiple non-overlapping sequences of consecutive entries. Typically, the processor adds a "Block ID" field to the report, and assigns, to this field, the respective identifiers of the blocks into which the packets are aggregated.

By way of example, if there are 1000 packets in the network-traffic report, the processor may aggregate the first 230 packets into a first block, the next 350 packets into a second block, and the last 420 packets into a third block. The processor may further assign a Block ID of "1" to the first 230 packets, "2" to the next 350 packets, and "3" to the last 420 packets.

In some embodiments, in performing block-defining step 43, the processor first aggregates the packets into a sequence of tentative blocks, by comparing the intervals between successive packets to relevant thresholds specified in the set of rules. For example, a Tx packet that immediately follows an Rx packet may be assigned to a different tentative block from that of the Rx packet if the interval between the two packets exceeds a first threshold interval; similarly, an Rx packet, or a Tx packet that immediately follows a Tx packet, may be assigned to a different tentative block from that of the preceding packet if the interval between the two packets exceeds a second threshold interval that is greater than the first threshold interval. Subsequently to defining the tentative blocks, the processor may combine two successive tentative blocks if the number of packets in the first of these blocks is within a range that is specified in the set of rules. The set of rules may further specify one or more other variables, such as a maximum number of successive tentative blocks that are allowed to be combined. As described above, the various sets of packet-aggregation rules vary from each other with respect to the values assigned to the aforementioned thresholds and other variables.

Subsequently to block-defining step 43, at a classifier-training step 66, a classifier is trained on the user-action log and the sequence of traffic blocks. Further details regarding this training are provided below, with reference to FIG. 5.

Following classifier-training step 66, at a third checking step 45, the processor checks whether all of the sets of packet-aggregation rules have been used. If not, the processor returns to rule-set-selecting step 42, and selects the next set of rules. Otherwise, at a classifier-selecting step 47, the processor selects the best-performing classifier, along with the corresponding set of packet-aggregation rules (i.e., the set of packet-aggregation rules that yielded the selected classifier). To perform classifier-selecting step 47, the processor first ranks the classifiers based on various criteria, and then selects the classifier having the highest ranking.

Typically, the ranking of the classifiers is based on the sizes of the respective training sets on which the classifiers were trained. For example, a first set of packet-aggregation rules may allow matching every user action to a respective corresponding block, whereas a second set of packet-aggregation rules may not allow this. In such a case, the classifier trained using the first set may be ranked higher than the classifier trained using the second set.

Alternatively or additionally, the processor may perform a cross-validation (e.g., a k-folds cross-validation) for each of the classifiers, and then rank the classifiers based on their respective cross-validation scores. (A poor cross-validation score may also be flagged for debugging purposes.)

Alternatively or additionally, the processor may compute, for each set of packet-aggregation rules, and for each of the action types, a similarity measure that quantifies the similarity between the blocks that were classified as belonging to the action type. For example, the processor may compute the standard deviation of the number of packets in each of the blocks, the total duration of each of the blocks, and/or other features of the blocks. The processor may then rank the classifiers based on these similarity measures, giving preference to those classifiers whose training sets exhibit greater inter-block similarity.

For example, a first set of packet-aggregation rules may yield a relatively high degree of similarity between the blocks classified as corresponding to the "post photo" action type, while a second set of packet-aggregation rules may yield a relatively low degree of similarity between such blocks. In response thereto—and assuming, for simplicity, that a similar disparity is exhibited with respect to the other action types—the processor may assign a higher rank to the classifier that was trained using the first set of rules.

Typically, those features that are given greater weight by the classifiers are also given greater weight by the processor in performing the ranking. Thus, for example, the standard deviation in the number of packets may influence the ranking more than the standard deviation in the total duration, if the number of packets is given greater weight by the classifiers.

In the event that two or more classifiers achieve the same ranking based on the criteria described above, the processor may rank the classifiers based on the packet-aggregations rules themselves. For example, preference may be given to a set of rules that specifies a smaller threshold interval for assigning two consecutive packets into different respective blocks, relative to a set of rules that specifies a larger threshold interval.

Figure 5:
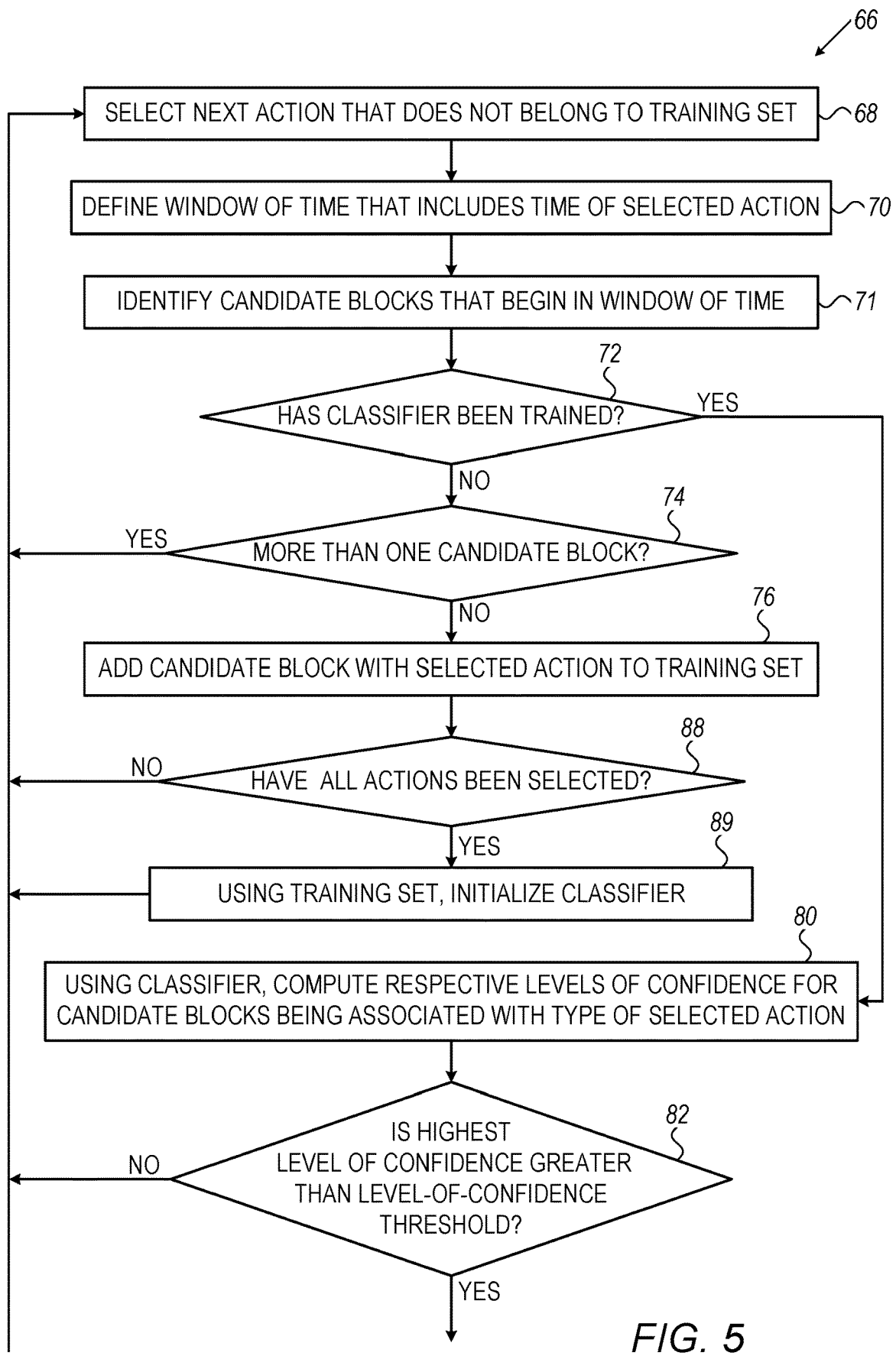
FIG. 5 is a flow diagram for a method for training a classifier, in accordance with some embodiments of the present disclosure.
Figure 5:
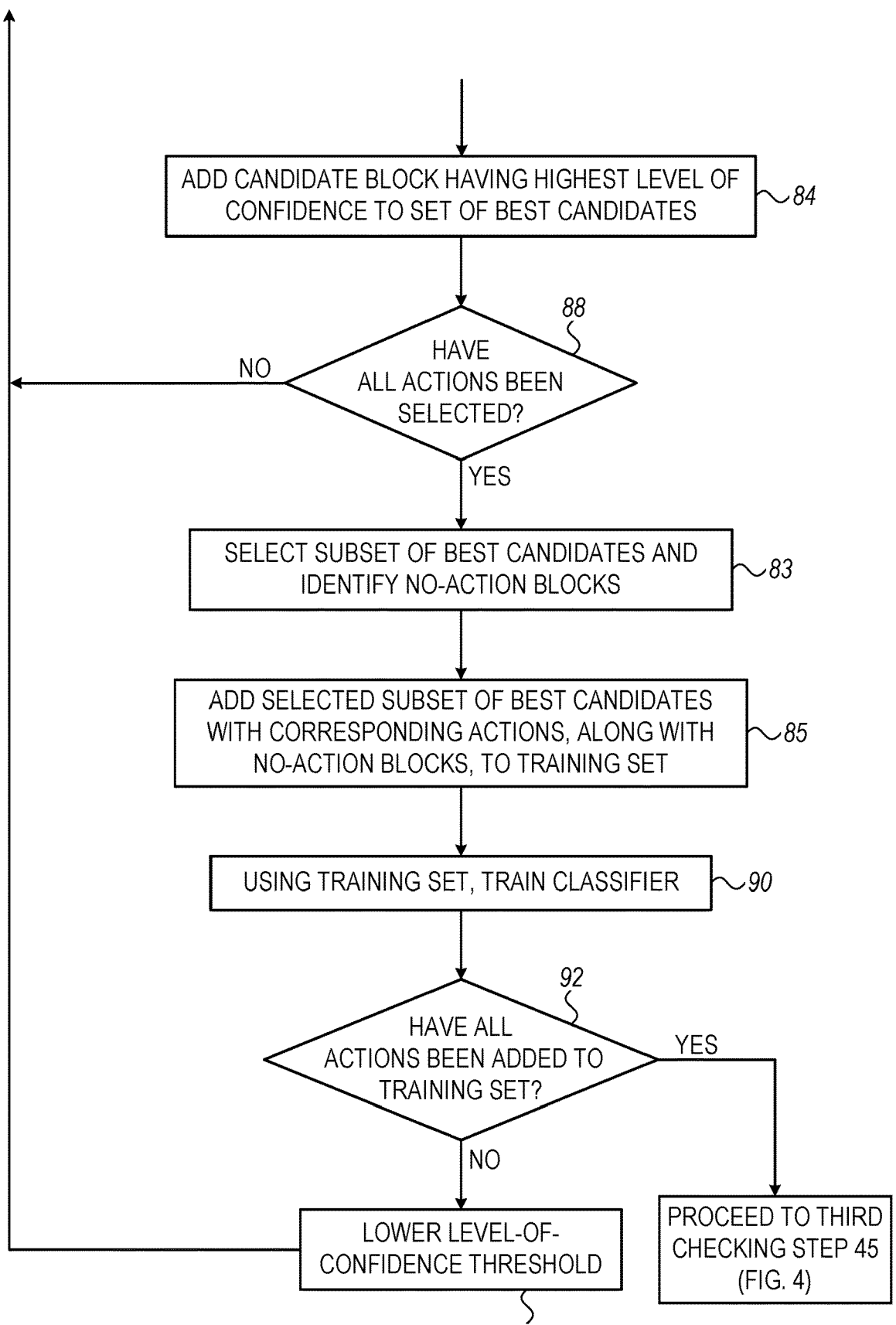

Details regarding classifier-training step 66 are shown in FIG. 5, which is a flow diagram for a method for training a classifier, in accordance with some embodiments of the present disclosure.

Classifier-training step 66 begins at a selecting step 68, at which the processor selects an action that does yet belong to the training set. Next, the processor identifies a set of candidate matching blocks, i.e., a set of blocks that are to be considered as potential matches to the selected user action, by correlating between the time of the action and the earliest receipt times of the blocks. In other words, the processor identifies, as candidates, those blocks whose respective earliest receipt times correspond to the time of the action.

For example, at a window-defining step 70, the processor may define a window of time that includes the time of the selected action. (For example, the window may begin 1000-3000 ms before the action time, and end 3000-5000 ms after the action time.) Subsequently, the processor, at a candidate-block-identifying step 71, may identify the candidate blocks, in response to these blocks beginning in the window of time.

In some cases, the processor may simply identify all of the blocks that begin in the window as candidates. Alternatively, the processor may use predefined rules to filter out certain blocks from candidacy. For example, the rules may specify that the action type of the selected action is known to generate at least one packet of a certain minimal size. In such a case, the processor may identify, as candidates, only those blocks that include at least one packet having this minimal size. As another example, the rules may specify that the action type of the selected action is known to generate bidirectional traffic. In such a case, the processor may identify, as candidates, only those blocks that include bidirectional traffic.

(It is noted that, to help prevent any given time window from containing traffic generated by more than one user action, the system separates successive user actions by a predefined interval of time that is sufficiently greater than the size of the window. However, notwithstanding this separation interval, most time windows contain multiple blocks of traffic, due to the background traffic exchanged between the application and the server. It is further noted that there are at least two reasons for beginning the time window before the action time. First, beginning the time window before the action time compensates for any excess inflation of the action time during the preprocessing of the user-action log. Second, it is possible that other communication, unrelated to the user action, took place immediately prior to and/or subsequently to the performance of the action, such that the block corresponding to the action begins earlier than would otherwise be expected.)

Subsequently to candidate-block-identifying step 71, the processor checks, at a fourth checking step 72, whether the classifier has been trained, i.e., whether the classifier was already initialized by an earlier training process (e.g., with respect to an earlier version of the application), or at least one iteration of classifier-training step 66 was already performed. If not, the processor checks, at a fifth checking step 74, whether more than one candidate block exists. If not, the processor, at a first training-set-augmenting step 76, adds the sole candidate block, with the selected user action, to the training set. In other words, the processor adds, to the training set, a labeled sample, in which the block is labeled with the type of the selected action. On the other hand, if there are multiple candidate blocks, the processor returns to selecting step 68, and selects the next action that does not yet belong to the training set.

In some embodiments, the block is added to the training set by extracting the raw entries that belong to the block from the (enhanced) report, and then adding these raw entries to the training set. In other embodiments, the block is added to the training set by first extracting a vector of features from the raw entries that belong to the block, and then adding this feature vector to the training set.

Following first training-set-augmenting step 76, the processor checks, at a seventh checking step 88, whether all of the user actions that were not yet added to the training set have been selected. If not, the processor returns to selecting step 68. Otherwise, the processor, at a classifier-initializing step 89, uses the training set to initialize a classifier. In doing so, the processor may use any suitable supervised learning algorithm, such as, for example, XGBoost or the Random Forest algorithm. The processor then returns to selecting step 68.

Returning now to fourth checking step 72, if the classifier has been trained, the processor, at a level-of-confidence computing step 80, uses the classifier to compute the respective levels of confidence for the candidate blocks being associated with the type of the selected action. For example, the processor may use the classifier to compute, for each of the candidate blocks, a respective likelihood that the candidate block is associated with the type of the selected action.

Next, at a sixth checking step 82, the processor checks whether the highest level of confidence is greater than a predefined level-of-confidence threshold. If not, the processor returns to selecting step 68. Otherwise, the processor, at a block-adding step 84, adds the block having the highest level of confidence to a set of best candidates.

For example, if the selected action is of the "post photo" type, the classifier may compute a likelihood of 60% that a first candidate block was generated from a "post photo" action, a likelihood of 40% that a second candidate block was generated from a "post photo" action, and a likelihood of 20% that a third candidate block was generated from a "post photo" action. In response thereto, the processor may add the first candidate block to the set of best candidates, provided that 60% is greater than the level-of-confidence threshold.

In some embodiments, as the processor iteratively augments the training set and retrains the classifier, the processor iteratively lowers the level-of-confidence threshold, as further described below. In other embodiments, the level-of-confidence threshold retains its initial value throughout the training process.

Following block-adding step 84, the processor checks, at seventh checking step 88, whether all of the user actions that were not yet added to the training set have been selected. If not, the processor returns to selecting step 68. Otherwise, the processor, at a subset-selecting step 83, selects a subset of the best candidates, as further described below with reference to FIG. 6. The processor further identifies each candidate block that shares a window with any one of the selected best candidates as a "no-action block," i.e., a block that does not correspond to any user action. Subsequently, the processor adds the selected subset with the respective corresponding actions, along with the no-action blocks, to the training set, at a second training-set augmenting step 85.

Subsequently, at a training step 90, the processor uses the training set to train the classifier. In doing so, the processor may use any suitable supervised learning algorithm, such as, for example, XGBoost or the Random Forest algorithm.

Subsequently, the processor checks, at an eighth checking step 92, whether all of the actions have been added to the training set. If not, the processor, at a threshold-adjusting step 94, lowers the level-of-confidence threshold, in preparation for the next iteration. The processor then returns to selecting step 68, and begins the next iteration.

Upon ascertaining, at eighth checking step 92, that all of the actions were added to the training set, the processor proceeds to third checking step 45, as described above with reference to FIG. 4.

In some cases, the processor may ascertain, at seventh checking step 88, that all of the user actions were selected, yet the set of best candidates is empty. (In other words, in some cases, no potential match has a level of confidence that is greater than the threshold, such that no potential matches are identified during the iteration.) In such a case, the processor may disregard the remaining user actions, and terminate the training process, i.e., the processor may proceed from seventh checking step 88 directly to third checking step 45. Alternatively, the processor may proceed from seventh checking step 88 directly to threshold-adjusting step 94, and may then lower the level-of-confidence threshold sufficiently such as to allow the training set to be augmented with additional samples.

In some embodiments, before training the classifier for the final time, the processor discards any outliers from the training set. For example, for each action type, the processor may separately train the classifier on various subsets of the blocks in the training set that were deemed to belong to the action type. For each of these trainings, the processor may ascertain the level of confidence with which the remaining blocks that were deemed to belong to action type are classified as belonging to the action type. Those blocks that consistently receive a low level of confidence (indicating a dissimilarity to the others) may be identified as outliers, and may therefore be discarded from the training set.

For example, following second training-set augmenting step 85, the processor may ascertain that all of the actions have been added to the training set. The processor may then prune the training set as described above, prior to performing training step 90. This pruning may be especially advantageous in the event that a relatively large number of samples were added to the training set only with a low level of confidence.

Figure 6:
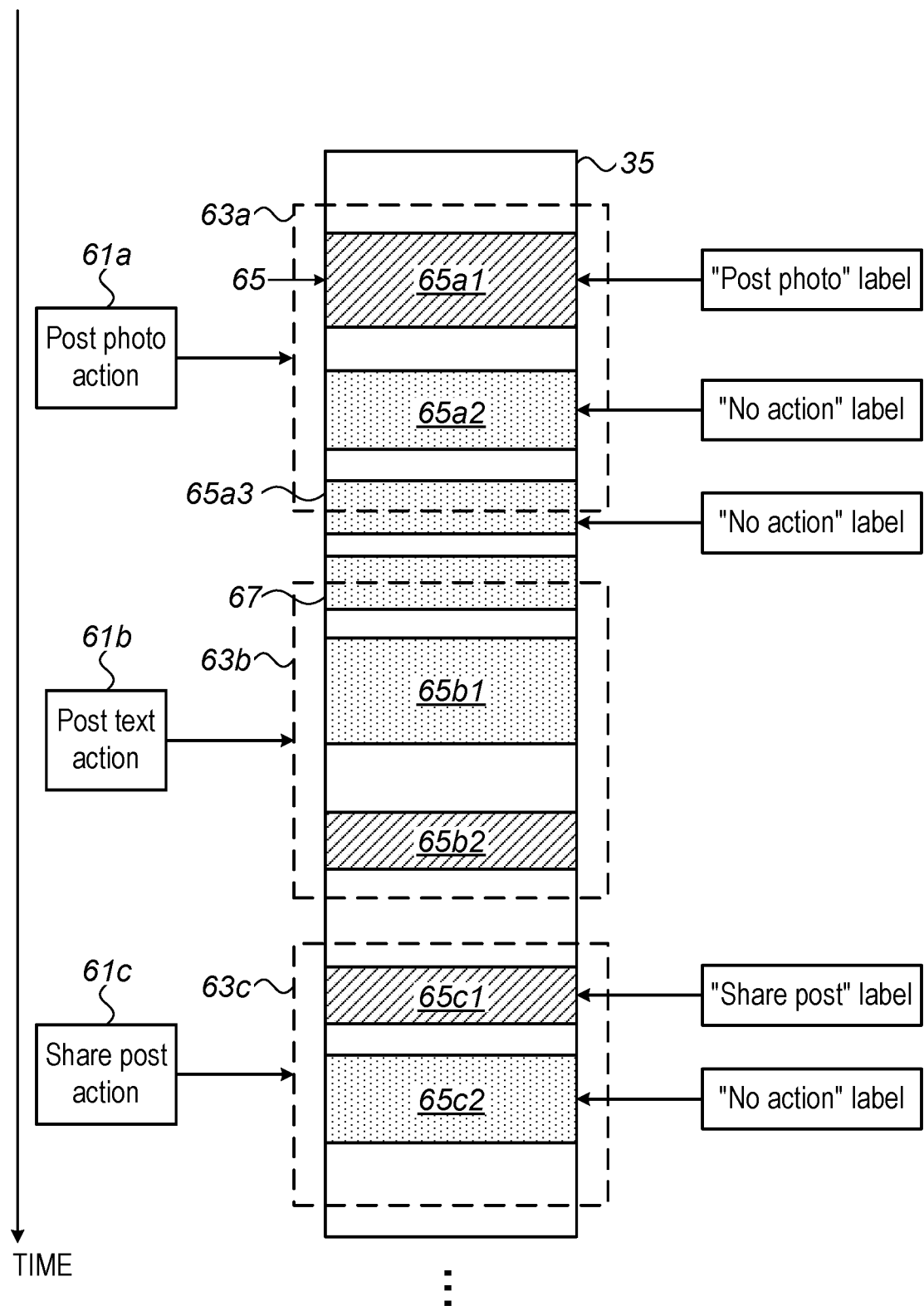
FIG. 6 pictorially illustrates various aspects of training a classifier, in accordance with some embodiments of the present disclosure.

To enhance the above description, reference is now made to FIG. 6, which pictorially illustrates various aspects of classifier-training step 66, in accordance with some embodiments of the present disclosure.

FIG. 6 depicts a post photo action 61a, a post text action 61b, and a share post action 61c, which are performed at different respective times. FIG. 6 further depicts network-traffic report 35, which, following block-defining step 43 (FIG. 4), includes various blocks 65 of traffic, each of which may include any number of packets.

As described above with reference to FIG. 5, the processor, at window-defining step 70, defines a window of time for each of the actions. In particular, the processor defines a first window 63a for action 61a, a second window 63b for action 61b, and a third window 63c for action 61c. First window 63a includes three candidate blocks 65a1, 65a2, and 65a3. (Block 65a3, despite ending after first window 63a, is included as a candidate block, given that it begins within first window 63a.) Second window 63b includes two candidate blocks 65b1 and 65b2. (Another block 67 is not included as a candidate block, given that it begins prior to second window 63b.) Third window 63c includes two candidate blocks 65c1 and 65c2.

As further described above with reference to FIG. 5, the processor, at level-of-confidence computing step 80, uses the classifier to compute the respective levels of confidence for candidate blocks 65a1, 65a2, and 65a3 corresponding to a post photo action. As indicated by the different pattern that fills candidate block 65a1, FIG. 6 assumes that candidate block 65a1 has the highest likelihood of corresponding to a post photo action. Thus, provided that this likelihood is greater than the threshold, candidate block 65a1 is added to the set of best candidates, at block-adding step 84.

Similarly, the processor computes the respective levels of confidence for candidate blocks 65b1 and 65b2 corresponding to a post text action, and for candidate blocks 65c1 and 65c2 corresponding to a share post action. Further to these calculations, candidate blocks 65b2 and 65c1 are added to the set of best candidates.

After repeating this process for any other actions not shown in FIG. 6, the processor, at subset-selecting step 83, selects a subset of best candidates, e.g., using the technique described immediately below. FIG. 6 assumes that candidate blocks 65a1 and 65c1 are included among the selected best candidates, while candidate block 65b2 is not. Hence, at second training-set augmenting step 85, (i) candidate block 65a1 (and/or various features extracted therefrom) is added, with a "post photo" label, to the training set, (ii) candidate block 65c1 (and/or various features extracted therefrom) is added, with a "share post" label, to the training set, and (iii) candidate blocks 65a2, 65a3, and 65c2 (and/or various features extracted therefrom) are added, with a "no action" label, to the training set. Subsequently, the classifier is trained.

Typically, to select the subset of best candidates, the processor ranks the best candidates for each action type by the percentage difference in the level of confidence between the best candidate and the next-best "competing" candidate. The processor then selects the N highest-ranking best candidates for each action type, where N is the maximum number of samples from each action type to be added to the training set during the current iteration. (If the number of best candidates for a particular action type is less than N, the processor may simply select all of the best candidates.) For example, the processor may implement a "learning rate" of 10% for each of the iterations, by setting N for each action type to 10% of the total number of user actions belonging to the action type.

By way of example, Table 2 shows hypothetical likelihoods for several candidate blocks for three different actions of a specific type:

TABLE 2

| Action | Candidate Block | Likelihood |
|---|---|---|
| Action_1 | Block_1_1 | 80% |
| Action_1 | Block_1_2 | 60% |
| Action_1 | Block_1_3 | 50% |

TABLE 2-continued

| Action | Candidate Block | Likelihood |
|---|---|---|
| Action_2 | Block_2_1 | 80% |
| Action_2 | Block_2_2 | 90% |
| Action_3 | Block_3_1 | 70% |
| Action_3 | Block_3_2 | 25% |

Given these likelihoods, and assuming a threshold that is less than 70%, Block_1_1, Block_2_2, and Block_3_1 are added to the set of best candidates. Next, assuming that N is less than three, the processor selects, from among the three best candidates, the top N best candidates. To perform this selection, the processor first assigns a score to each of the best candidates. In particular, Block_1_1 is assigned a score of 33%, given that the likelihood for Block_1_1 is 33% higher than the likelihood for Block_1_2, which is the next-best candidate that competes with Block_1_1 for a match to Action_1. Block_2_2 is assigned a score of 12.5%, given that the likelihood for Block_2_2 is 12.5% higher than the likelihood for Block_2_1. Block_3_1 is assigned a score of 180%, given that the likelihood for Block_3_1 is 180% higher than the likelihood for Block_3_2. Next, the processor ranks the best candidates based on their respective scores, such that Block_3_1 is ranked ahead of Block_1_1, which in turn is ranked ahead of Block_2_2. Finally, the processor selects the one or two highest-ranking best candidates.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A system, comprising:
a communication interface; and
a processor, configured to:
obtain a user-action log that specifies (i) a series of actions, of respective action types, performed using an application, and (ii) respective action times at which the actions were performed,
using the communication interface, obtain a network-traffic report that specifies properties of a plurality of packets that were exchanged, while the series of actions were performed, between the application and a server for the application, the properties including respective receipt times at which the packets were received while en route between the application and the server,
based on the receipt times, define multiple non-overlapping blocks of consecutive ones of the packets,
inflate the action times, by, for each unique action type, computing, for a subgroup of the actions that are of the unique action type, respective estimated communication delays, by, for each action in the subgroup:

identifying a block whose earliest receipt time follows the action time of the action and is closest to the action time of the action, relative to the other blocks, and computing the estimated communication delay for the action, by subtracting the action time of the action from the earliest receipt time of the identified block, computing a median of the estimated communication delays, and adding the median to the respective action times of the subgroup;

identify a correspondence between the actions and respective corresponding ones of the blocks, by correlating between the action times and the receipt times, and based on the identified correspondence, train a classifier to associate other blocks of packets with respective ones of the action types based on the properties of the other blocks.

2. The system according to claim 1, wherein the processor is configured to identify the correspondence and train the classifier by iteratively (i) using the classifier to select additional ones of the corresponding blocks by, for each action in a subset of the actions that do not yet belong to the training set:
identifying one or more candidate blocks whose respective earliest receipt times correspond to the action time of the action, and
using the classifier to select one of the candidate blocks as the block that corresponds to the action, and (ii) augmenting a training set with the additional corresponding blocks, and (iii) using the augmented training set, retraining the classifier.

3. The system according to claim 2, wherein the processor is configured to identify the candidate blocks by:
defining a window of time that includes the action time of the action, and
identifying the candidate blocks in response to the candidate blocks beginning in the window of time.

4. The system according to claim 2, wherein the processor is configured to use the classifier to select one of the candidate blocks by:
using the classifier, computing respective levels of confidence for the candidate blocks being associated with the action type of the action, and
selecting the candidate block whose level of confidence is highest, relative to the other candidate blocks.

5. The system according to claim 4, wherein the processor is configured to select the candidate block whose level of confidence is highest provided that the highest level of confidence is greater than a level-of-confidence threshold, and wherein the processor is further configured to iteratively lower the level-of-confidence threshold when iteratively augmenting the training set.

6. The system according to claim 4, wherein the processor is further configured to add the other candidate blocks as no-action blocks, with respective labels indicating that the other candidate blocks do not correspond to any of the actions, to the training set.

7. The system according to claim 1, wherein the processor is further configured to:
repeatedly define the blocks based on different respective sets of packet-aggregation rules, such that multiple classifiers are trained for the different respective sets of packet-aggregation rules, and select a best-performing one of the multiple classifiers for use.

8. A method, comprising:
obtaining a user-action log that specifies (i) a series of actions, of respective action types, performed using an application, and (ii) respective action times at which the actions were performed;

obtaining a network-traffic report that specifies properties of a plurality of packets that were exchanged, while the series of actions were performed, between the application and a server for the application, the properties including respective receipt times at which the packets were received while en route between the application and the server;

based on the receipt times, defining multiple non-overlapping blocks of consecutive ones of the packets;

inflating the action times by computing, for a subgroup of the actions that are of the unique action type, respective estimated communication delays, by, for each action in the subgroup:
identifying a block whose earliest receipt time follows the action time of the action and is closest to the action time of the action, relative to the other blocks, and
computing the estimated communication delay for the action, by subtracting the action time of the action from the earliest receipt time of the identified block;
computing a median of the estimated communication delays; and
adding the median to the respective action times of the subgroup;

identifying a correspondence between the actions and respective corresponding ones of the blocks, by correlating between the action times and the receipt times; and based on the identified correspondence, training a classifier to associate other blocks of packets with respective ones of the action types based on the properties of the other blocks.

9. The method according to claim 8, wherein identifying the correspondence and training the classifier comprises iteratively (i) using the classifier to select additional ones of the corresponding blocks, by, for each action in a subset of the actions that do not yet belong to the training set:
identifying one or more candidate blocks whose respective earliest receipt times correspond to the action time of the action; and
using the classifier to select one of the candidate blocks as the block that corresponds to the action;

(ii) augmenting a training set with the additional corresponding blocks, and (iii) using the augmented training set, retraining the classifier.

10. The method according to claim 9, wherein identifying the candidate blocks comprises:
defining a window of time that includes the action time of the action; and
identifying the candidate blocks in response to the candidate blocks beginning in the window of time.

11. The method according to claim 9, wherein using the classifier to select one of the candidate blocks comprises:
using the classifier, computing respective levels of confidence for the candidate blocks being associated with the action type of the action, and
selecting the candidate block whose level of confidence is highest, relative to the other candidate blocks.

12. The method according to claim 11, wherein selecting the candidate block whose level of confidence is highest comprises selecting the block whose level of confidence is highest provided that the highest level of confidence is greater than a level-of-confidence threshold, and wherein iteratively augmenting the training set further comprises iteratively lowering the level-of-confidence threshold.

13. The method according to claim 11, wherein iteratively augmenting the training set further comprises adding the other candidate blocks as no-action blocks, with respective labels indicating that the other candidate blocks do not correspond to any of the actions, to the training set.

14. The method according to claim 8, further comprising:
   repeatedly defining the blocks based on different respective sets of packet-aggregation rules, such that multiple classifiers are trained for the different respective sets of packet-aggregation rules; and
   selecting a best-performing one of the multiple classifiers for use.

* * * * *